(12) United States Patent
van den Berg et al.

(10) Patent No.: US 9,938,085 B2
(45) Date of Patent: Apr. 10, 2018

(54) MODULAR CONVEYOR MAT AND MODULE THEREFOR, AND SPROCKET WHEEL AND CONVEYOR SYSTEM

(71) Applicant: Rexnord FlatTop Europe B.V., 's-Gravenzande (NL)

(72) Inventors: Rick Wilhelmus van den Berg, 's-Gravenzande (NL); Cornelis Hendrik Mijndert Menke, 's-Gravenzande (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 0 days.

(21) Appl. No.: 15/111,086

(22) PCT Filed: Jan. 14, 2015

(86) PCT No.: PCT/NL2015/050022
§ 371 (c)(1),
(2) Date: Jul. 12, 2016

(87) PCT Pub. No.: WO2015/108416
PCT Pub. Date: Jul. 23, 2015

(65) Prior Publication Data
US 2016/0332821 A1 Nov. 17, 2016

(30) Foreign Application Priority Data

Jan. 15, 2014 (NL) ...................................... 2012090

(51) Int. Cl.
| | |
|---|---|
| B65G 17/38 | (2006.01) |
| B65G 17/08 | (2006.01) |
| B65G 23/06 | (2006.01) |

(52) U.S. Cl.
CPC ............. *B65G 17/08* (2013.01); *B65G 23/06* (2013.01)

(58) Field of Classification Search
CPC ................................ B65G 17/08; B65G 17/40
(Continued)

(56) References Cited

U.S. PATENT DOCUMENTS

| | | | | |
|---|---|---|---|---|
| 2,222,025 A | | 11/1940 | Fischer | |
| 2,243,145 A | * | 5/1941 | Batchell | ................. B65G 17/08 |
| | | | | 198/834 |

(Continued)

FOREIGN PATENT DOCUMENTS

| | | |
|---|---|---|
| CN | 1220228 A | 6/1999 |
| CN | 1343616 A1 | 4/2002 |

(Continued)

OTHER PUBLICATIONS

International Search Report as dated May 11, 2015 for International Application No. PCT/NL2015/050022.

*Primary Examiner* — William R Harp
(74) *Attorney, Agent, or Firm* — Quarles & Brady LLP

(57) ABSTRACT

Module (1) for a modular conveyor mat, comprising a body part (2) extending transversely to a conveying direction with a top (3) and a bottom (4), which bottom is provided with a tooth chamber (6) for receiving a driving tooth of a sprocket wheel. The body part, at a front (7) and rear (8), is provided with a series of hinge parts (9) and receiving spaces (10) alternately successive transversely to the conveying direction, so that successive modules (1) are hingedly couplable using hinge pins (11) extending through hinge bores (13) provided in the hinge parts. The front is part of a front body part (2A) of the module and the rear is part of a rear body part (2B) of the module. The front and rear body parts are hingedly connected with each other relative to a pivoting axis (Z), which traverses the tooth chamber (6).

12 Claims, 9 Drawing Sheets

(58) Field of Classification Search
USPC .................................... 198/844.1, 850–853
See application file for complete search history.

(56) References Cited

U.S. PATENT DOCUMENTS

| | | | | |
|---|---|---|---|---|
| 4,989,723 | A | * | 2/1991 | Bode ..................... B65G 17/08 |
| | | | | 198/635 |
| 5,083,659 | A | | 1/1992 | Bode et al. |
| 5,335,768 | A | * | 8/1994 | Schladweiler ......... B65G 17/08 |
| | | | | 198/853 |
| 6,766,899 | B1 | * | 7/2004 | Guldenfels ............ B65G 17/08 |
| | | | | 198/834 |
| 2006/0081449 | A1 | | 4/2006 | Gundlach |
| 2009/0266682 | A1 | | 10/2009 | Elsner |

FOREIGN PATENT DOCUMENTS

| | | |
|---|---|---|
| CN | 101754916 A | 6/2010 |
| CN | 202152199 U | 2/2012 |
| DE | 102011112398 A1 | 3/2013 |
| JP | 2006111394 A | 4/2006 |
| JP | 3836081 B2 | 10/2006 |
| NL | 1 008 600 | 9/1999 |
| WO | 2008020755 A3 | 2/2008 |
| WO | 2013024057 A1 | 2/2013 |

\* cited by examiner

MODULAR CONVEYOR MAT AND MODULE THEREFOR, AND SPROCKET WHEEL AND CONVEYOR SYSTEM

CROSS-REFERENCE TO RELATED APPLICATIONS

This application represents the national stage entry of PCT International Application No. PCT/NL2015/050022 filed on Jan. 14, 2015 and is based upon and claims the benefit of priority from Dutch Patent Application No. 2012090, filed on Jan. 15, 2014, the entire contents of all of which are incorporated herein by reference.

BACKGROUND

The invention relates to a module for a modular conveyor mat, and to a conveyor mat built up from modules.

Such modules and mats are generally known and are used for conveying products. The modules are usually manufactured by molding, and are often manufactured from plastic material.

A customary module comprises a body part extending transversely to a conveying direction with a top for carrying products to be conveyed and a bottom for cooperation with a conveying track. The body part comprises at the front and rear as viewed in the conveying direction a series of hinge parts with contiguous receiving spaces alternately successive transversely to the conveying direction, so that hinge parts and receiving spaces can interdigitate with receiving spaces and hinge parts of similar modules successive in the conveying direction. Successive modules can then be hingedly coupled using hinge pins extending transversely to the conveying direction, reaching through hinge bores provided in the hinge parts.

In this manner, modules successive in the conveying direction can be joined to form a mat of a desired length. The mat is usually of endless design, so that it can be passed over a conveying track using return wheels. The width of the mat can then be varied by placing several modules next to each other transversely to the conveying direction and coupling them using continuous hinge pins. Rows of modules successive in the conveying direction may then be mutually staggered transversely to the conveying direction, so that continuous slits in the conveying direction between the modules of the mat can be avoided.

The bottom of the module may, near the middle as viewed in the conveying direction, be provided with a tooth chamber extending transversely to the conveying direction for receiving a tooth of a sprocket wheel. An advantage of such a configuration is that the sprocket wheel can guide the mat well. When the sprocket wheel is a driving wheel, furthermore, a relatively great force can be transferred. Such a module is known from NL1008600 in applicant's name, and is commercially obtainable as '1005 series mattop chain' of Rexnord. In this module, the tooth chamber extends in the conveying direction over a distance greater than the width of one hinge part, and transversely to the conveying direction over a distance greater than the width of two hinge parts.

A disadvantage of such a tooth chamber, however, is that it is difficult, because of the space needed for the tooth chamber, to make the pitch of the mat small. In practice, the minimum pitch of the known modules with such a tooth chamber is at least 1 inch. Consequently, the module, when rounding a smaller sprocket wheel, can follow the circular form less well, so that the so-called polygon effect is relatively strong. In practice, during rounding, the polygon effect can lead to height variation and speed variation of the terminal end of the upper part of the conveyor mat. This can lead to problems especially with sprocket wheels having fewer than 10 teeth, given the above-mentioned minimum pitch of 1 inch.

SUMMARY

The object of the invention is to provide a module for a modular conveyor mat and a conveyor mat built up from such modules, with which, while the advantages mentioned are preserved, the disadvantages mentioned can be counteracted. In particular, the object of the invention is to provide a module with a tooth chamber in the body part that has a reduced polygon effect. To this end, the invention provides a module for a modular conveyor mat, comprising a body part extending transversely to a conveying direction with a top for carrying products to be conveyed and a bottom for cooperating with a conveying track, which bottom, near the middle as viewed in the conveying direction of the module, is provided with a tooth chamber extending transversely to the conveying direction for receiving a tooth of a sprocket wheel, wherein the body part, at a front and rear as viewed in the conveying direction, is provided with a series of hinge parts and receiving spaces alternately successive transversely to the conveying direction, so that hinge parts and receiving spaces can interdigitate with receiving spaces and hinge parts of similar modules successive in the conveying direction, and successive modules are hingedly couplable using hinge pins extending transversely to the conveying direction, reaching through hinge bores provided in the hinge parts, wherein the front is part of a, viewed in the conveying direction, front body part of the module and wherein the rear is part of a, viewed in the conveying direction, rear body part of the module, and wherein the front and rear body parts are hingedly connected with each other relative to a pivoting axis extending transversely to the conveying direction, which traverses the tooth chamber. As a result of the division of the module into two body parts pivotably connected with each other, the module has, as it were, an articulate construction, and the module when rounding a sprocket wheel can follow the circular form better by internal pivoting.

Such an internal hinge in the module can be realized, for instance, by connecting the body parts using a so-called living hinge, but can also be realized, as will be elucidated in more detail, using an inner hinge implemented as a line hinge.

When the pivoting axis is located, viewed in the conveying direction of the module, in or near the middle of the module, and when the front part and the rear part are pivotable relative to each other, the polygon effect can, on balance, be reduced for lower numbers of teeth by as much as more than half. If the pitch of the module between the front and rear hinge parts in unpivoted condition is 1 inch (about 2.54 mm), the polygon effect upon rounding a sprocket wheel can be comparable with a pitch of 0.5 inch (about 1.26 mm). The body parts are preferably substantially flat and form-retaining during pivoting.

When the front and rear body parts are each separate, molded parts, the components of the articulate module can be manufactured efficiently.

When the front part and the rear part are each, on the mutually facing sides, provided with inner hinge parts and receiving spaces alternately successive transversely to the conveying direction that cooperate as an internal hinge of the module, material fatigue as a result of pivoting can be counteracted.

When the cooperating inner hinge parts are arranged in two sets, which are spaced apart transversely to the conveying direction at a mutual intermediate distance thereby enclosing the tooth chamber, a very compact construction of the body part in the conveying direction can be realized. As a result, the pitch between the front and rear hinge parts in unpivoted condition may be less than 1 inch. At the location of the enclosed tooth chamber, the mutually facing parts of the front and rear body part may be implemented as substantially flat surfaces running transversely to the conveying direction which can cooperate with side flanks of teeth of the sprocket wheel. The longitudinal edges of these parts located at the top of the module can then lie straightly against each other. The tooth chamber is then, as it were, built in instead of intermediate inner hinge parts.

When the sets of cooperating inner hinge parts are each coupled using separate internal hinge pins extending transversely to the conveying direction, reaching through hinge bores provided in the inner hinge parts, a very high tensile-strength, fatigue-resistant but compact construction can be realized. The hinge axis of the internal line hinge formed then coincides with the pivoting axis of the front and rear body parts, and the central axis of the internal hinge pins coincides with the hinge axis/pivoting axis. The mathematical pivoting axis traverses the tooth chamber, but the physical hinge axis, i.e., the hinge pins, is then interrupted at the location of the tooth chamber.

The bores in the inner hinge parts that are contiguous to the sides of the module can optionally be of blind or reduced design. The internal hinge pins can then be protected against migration. During assembly of the module, the internal hinge pins can be introduced via the tooth chamber.

The invention also relates to a modular conveyor mat comprising a number of rows, successive in the conveying direction, of modules of the above-described type, wherein the hinge parts and interspaces at the respective front and rear of the successive modules cooperate, and wherein successive modules are hingedly coupled using hinge pins extending transversely to the conveying direction, reaching through hinge bores provided in the hinge parts. The rows of modules transversely to the conveying direction can then comprise several modules located next to each other. Such modules located next to each other in the row may be coupled using the hinge pins extending continuously transversely to the conveying direction between modules located next to each other, reaching through hinge bores provided in the hinge parts at the front and rear, while the internal hinge pins are interrupted at the location of the adjacent modules. This facilitates assembly of the conveyor mat from the articulate modules. The hinge pins between successive modules elegantly extend throughout the width of the mat. The articulate modules, with their pivotably connected front and rear hinge part, then form a subassembly which is pre-assembled, for instance by insertion of internal hinge pins.

The invention also relates to a sprocket wheel for cooperation with a modular conveyor mat, comprising a hub part, a substantially annular toothed ring, and a body part connecting the hub part and the toothed ring, wherein the toothed ring comprises a series of teeth spaced apart at an equal pitch along the circumference of a pitch circle for cooperation with a tooth chamber of a module, characterized in that the teeth are provided at their base with flat supporting surfaces which jointly form a polygon corresponding to the number of teeth, whose angular points are located at a half pitch distance between the teeth, and during use are located at the location of the cooperating hinge parts at the front and rear of successive mat modules. The angular points are located in circumferential direction at the location of the middle of the teeth and at the location of the half pitch between the teeth. With such a sprocket wheel provided with bent supporting surfaces, the modular conveyor mat can properly follow the sprocket wheel during rounding, also when it is a driven sprocket wheel. It is noted that U.S. Pat. No. 5,083,659 describes a sprocket wheel where the angular points are located circumferentially at the location of the half pitch between the teeth, but not at the location of the middle of the teeth.

The invention also relates to a conveyor system, comprising a modular conveyor mat of the above-described type, wherein the series of successive modules of the conveyor mat form an endless loop which circulates between return wheels, at least a number of return wheels being implemented as a sprocket wheel as described above, wherein the teeth of the toothed ring of the sprocket wheels engage in tooth chambers of the modules, and wherein the angular points of the toothed ring during use are located at the location of the cooperating hinge parts at the front and rear of successive mat modules.

Side flanks of the teeth of the sprocket wheel can then, in case of a driving sprocket wheel, cooperate drivingly with driving surfaces in the tooth chamber. The driving surfaces can then extend between top and bottom of the module, and can extend transversely to the conveying direction along several hinge parts and receiving spaces.

It will be clear to those skilled in the art that the technical measures elucidated in the above paragraphs can not only be advantageously used each alone in a module, modular conveyor mat, sprocket wheel, or conveyor system, but also in any possible combination. This can involve a module, modular conveyor mat, sprocket wheel, or conveyor system according to the pre-characterizing clause of the independent claims, but it will also be clear to the artisan that technical features from the pre-characterizing clause of these claims that are not required for realizing the measures elucidated in the above-mentioned paragraphs, can be omitted. The technical measures described in the paragraphs can then be isolated from the context, and the isolated technical features from the different paragraphs can be combined. Such combinations are hereby specifically disclosed in this description.

BRIEF DESCRIPTION OF THE DRAWINGS

The invention will be further elucidated on the basis of a non-limiting exemplary embodiment which is represented in a drawing. In the drawing.

DETAILED DESCRIPTION

Figure 1:
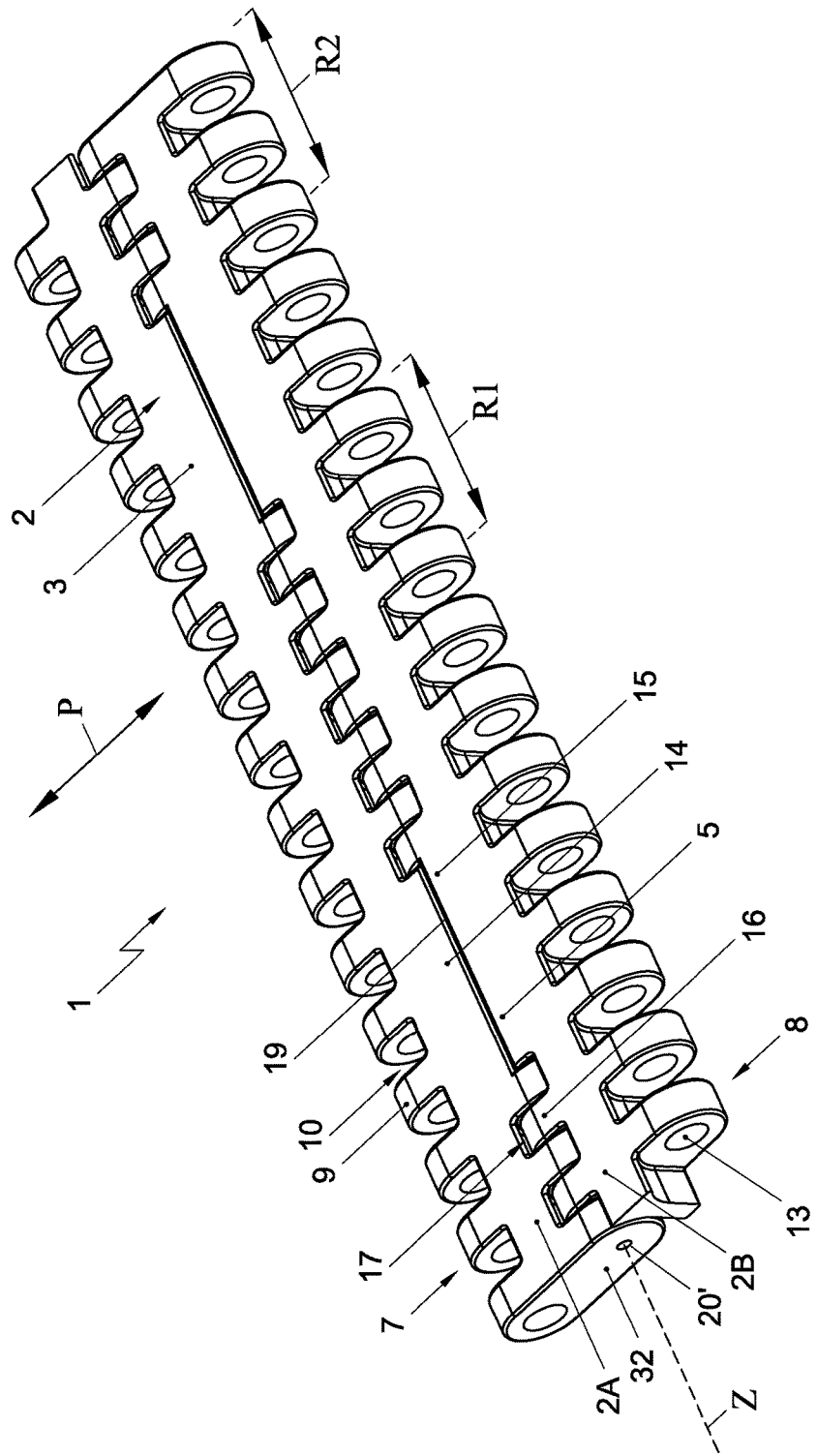
FIG. 1 shows a schematic perspective top plan view of a mat module in flat condition.

It is noted that the figures are only schematic representations of a preferred embodiment of the invention. In the figures, like or corresponding parts are indicated with the same reference numerals.

Figure 2:
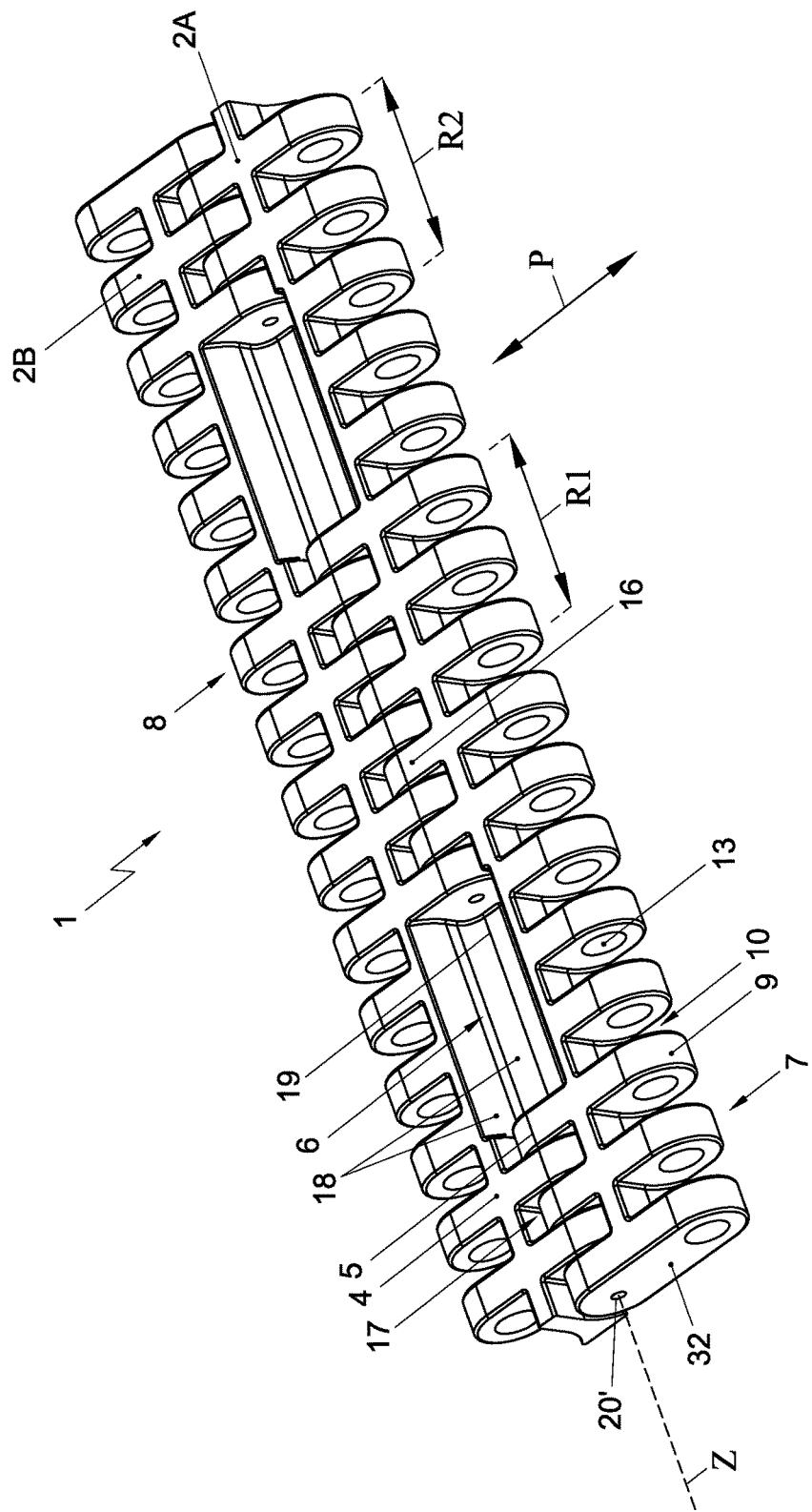
FIG. 2 shows a schematic perspective bottom view of a part of the mat module of FIG. 1 in flat condition.
Figure 3:
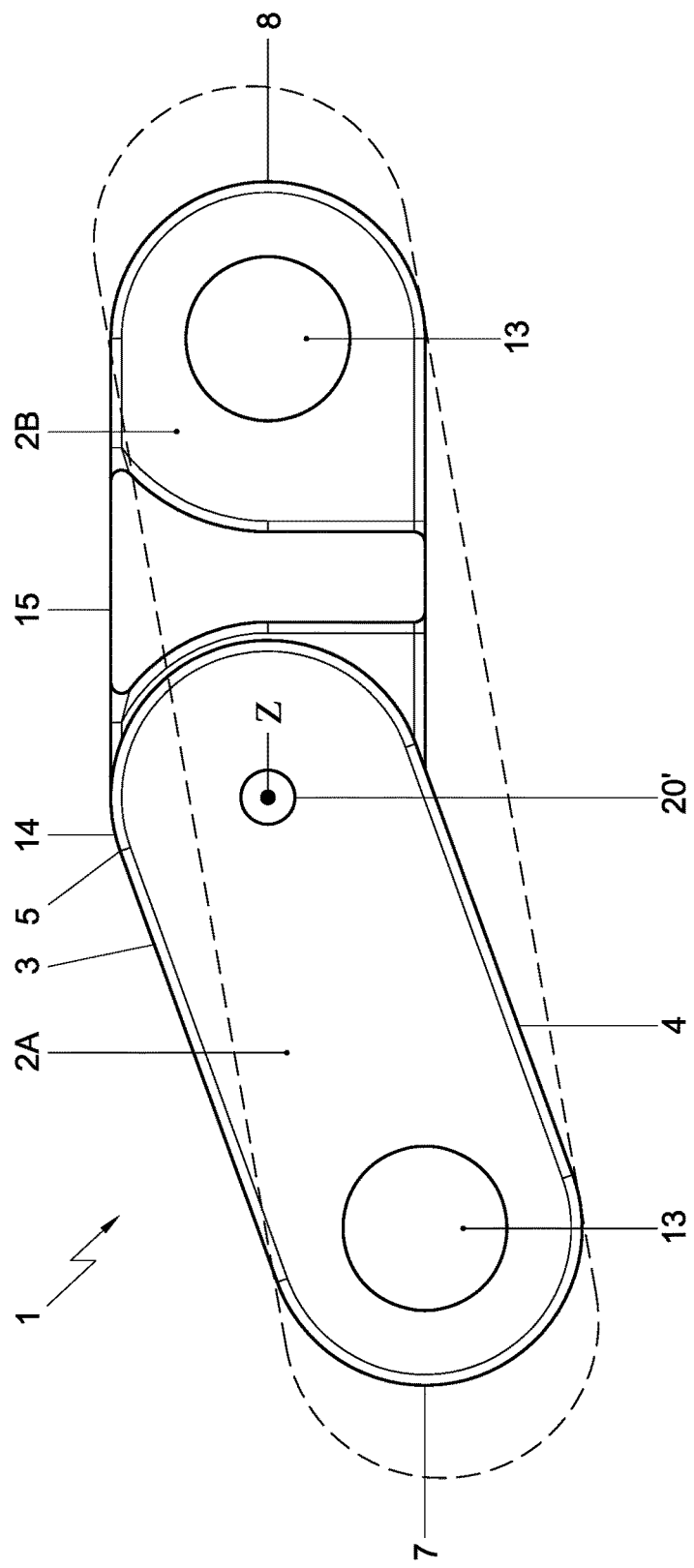
FIG. 3 shows a schematic perspective side view of the mat module of FIG. 1 whilst rounding a sprocket wheel.

Referring to the figures, in particular FIGS. 1-3, there is shown a module 1 for a modular conveyor mat. The mat module 1 comprises a body part 2 extending transversely to a conveying direction indicated with a double-headed arrow P, with a top 3 for carrying products to be conveyed and a bottom 4 for cooperating with a conveying track, not shown. The bottom 4 is provided, near the middle 5 as viewed in conveying direction P of the module 1, with a tooth chamber 6 extending transversely to the conveying direction for receiving a tooth of a sprocket. The body part 2 is provided, at a front 7 and rear 8 as viewed in the conveying direction, with a series of hinge parts 9 and receiving spaces 10 alternately successive transversely to the conveying direction. The hinge parts 9 and receiving spaces 10 can interdigitate with receiving spaces and hinge parts of similar modules successive in conveying direction P. Successive modules can be hingedly coupled using mat hinge pins 11 extending transversely to the conveying direction P, reaching through hinge bores 13 provided in the hinge parts 9. The front is part of a—viewed in the conveying direction—front body part 2A of the module 1, and the rear is part of a—viewed in the conveying direction—rear body part 2B of the module. The front body part 2A and the rear body part 2B are hingedly connected with each other relative to a pivoting axis Z extending transversely to the conveying direction, which traverses the tooth chamber 6.

Due to the division of the module into two body parts pivotably connected with each other, the module has, as it were, an articulate construction, and the module when rounding a sprocket wheel can follow the circular form better by pivoting internally. This is clearly visualized in FIG. 3 by comparison with a non-articulate, stiff module of equal pitch, represented in dashed lines. In this exemplary embodiment, there is provided an internal hinge, which is implemented as an inner hinge 12 implemented as a line hinge. As can be seen in FIG. 3, the front and rear body parts 2A, 2B in this exemplary embodiment are substantially flat and form-retaining during pivoting. The front and rear body parts 2A, 2B are here each implemented as a separate injection molded part from plastic material.

The front part 2A and the rear part 2B in this example are each provided, on the mutually facing sides 14, 15, with inner hinge parts 16 and inner receiving spaces 17 alternately successive transversely to the conveying direction, which cooperate as an inner hinge 12 of the module 1. The cooperating inner hinge parts 16, 17 are arranged in two sets R1 and R2, respectively, which are spaced apart transversely to the conveying direction P at a mutual intermediate distance, thereby enclosing the tooth chamber 6. The pitch between the front and rear hinge parts in unpivoted condition in the exemplary embodiment is 1 inch, but may be smaller, for instance, 0.75 or 0.5 inch.

At the location of the enclosed tooth chamber 6, the mutually facing sides 14, 15 of the front and rear body parts 2A, 2B are implemented as substantially flat surfaces 18 running transversely to the conveying direction P, which can cooperate with side flanks of teeth of the sprocket wheel. The longitudinal edges 19 of these surfaces 18 located at the top 3 of the module 1 abut straightly against each other. The top 3 of the module 1 in this example is substantially closed, and the tooth chamber 6 is closed at the top. The flat surfaces 18 extend between top and bottom 3,4 of the module 1, and extend transversely to the conveying direction along three hinge parts 9. In the conveying direction, the dimension of the tooth chamber is approximately equal to the width of a hinge part 9. The flat surfaces 18 of the tooth chamber 6 are movable relative to each other.

Figure 4:
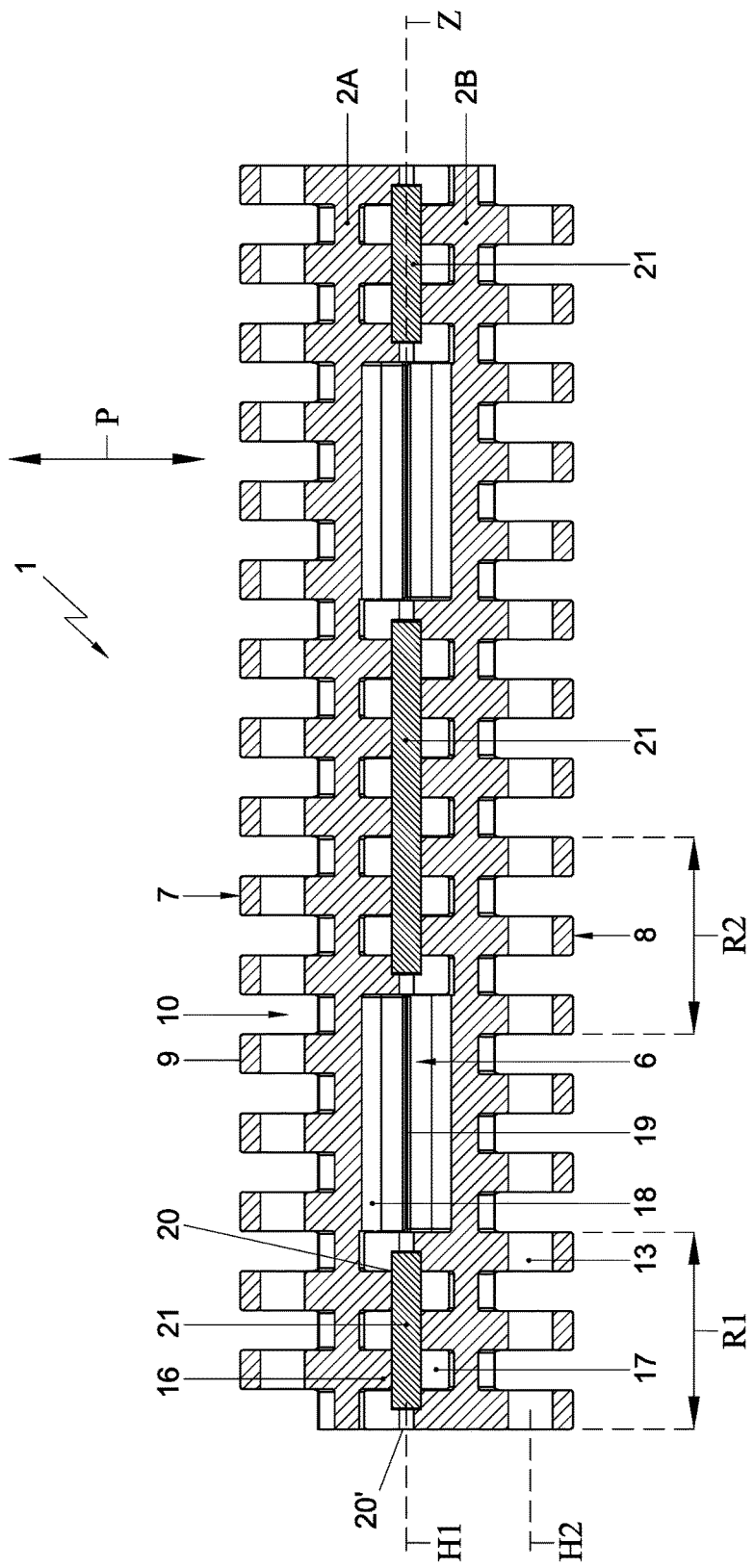
FIG. 4 shows a schematic planar cross section of the mat module of FIG. 1.

The sets R1, R2 of cooperating inner hinge parts 16 are each coupled using a separate internal hinge pin 21 extending transversely to the conveying direction, running through hinge bores 20 provided in the inner hinge parts 16. This can be properly seen in FIG. 4. The hinge axis of the internal line hinge formed coincides with the pivoting axis Z of the front and rear body parts, and the central axis H1 of the internal hinge pins 21 coincides with hinge axis/pivoting axis Z. The mathematical pivoting axis Z traverses the tooth chamber 6, but the physical hinge axis, i.e., the hinge pins 21, is interrupted at the location of the tooth chamber. The inner hinge bores 20' in the inner hinge parts 16 that bound the sides 32 of the module 1 are of reduced design in this example. The internal hinge pins 21 are thereby protected from running out. During assembly of the module 1, the internal hinge pins 21 are introduced via tooth chamber 6 in this example.

Figure 5:
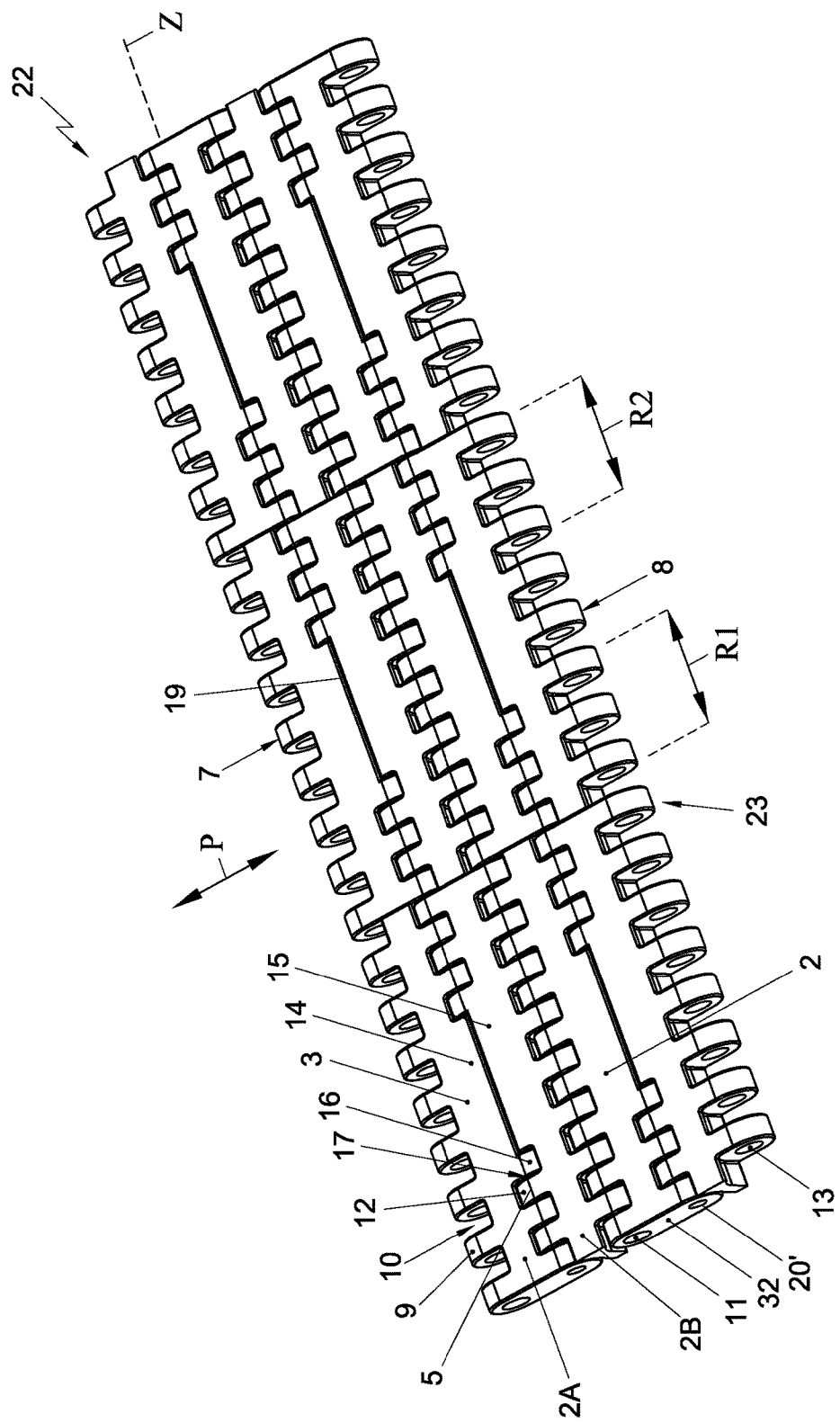
FIG. 5 shows a schematic perspective top plan view of a part of a modular conveyor mat in flat condition.
Figure 6:
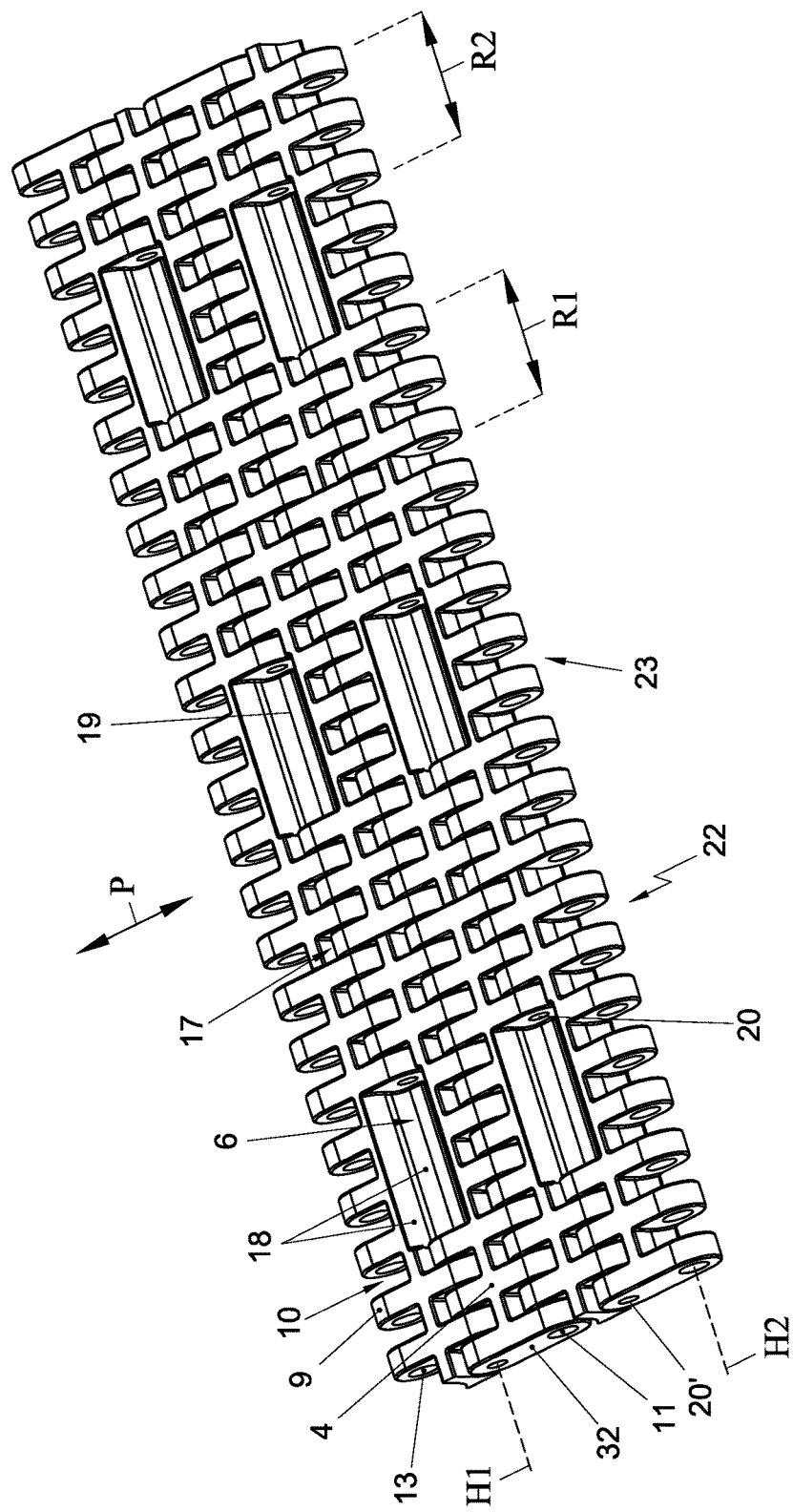
FIG. 6 shows a schematic perspective bottom view of a part of a modular conveyor mat in flat condition.
Figure 7:
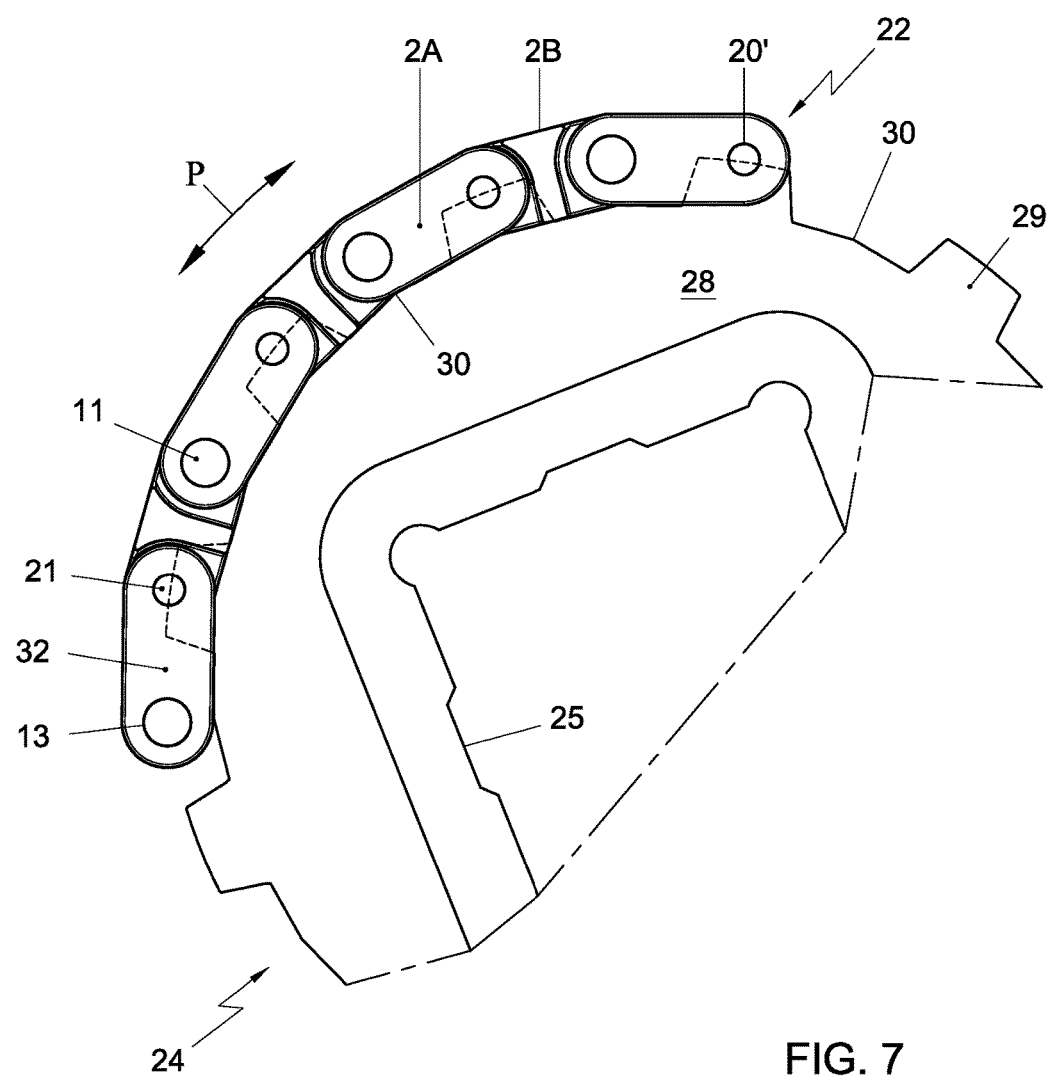
FIG. 7 shows a schematic perspective side view of a part of a modular conveyor mat whilst rounding a sprocket wheel.

FIGS. 5-7 show a modular conveyor mat 22, comprising a number of rows 23 of modules 1, successive in conveying direction P. The hinge parts 9 and interspaces 10 at the respective front and rear 7,8 of the successive modules 1 cooperate, and the successive modules 1 are hingedly coupled using hinge pins 11 extending transversely to the conveying direction, reaching through hinge bores 13 provided in the hinge parts 9. The rows 23 of modules 1 in this example comprise several modules 1 located next to each other transversely to the conveying direction P. The modules 1 located next to each other in the row 23 are coupled in that the hinge pins 11, extending transversely to the conveying direction, run continuously throughout the width of the conveyor mat 22. The internal hinge pins 21 are interrupted at the location of the adjacent modules.

Figure 8:
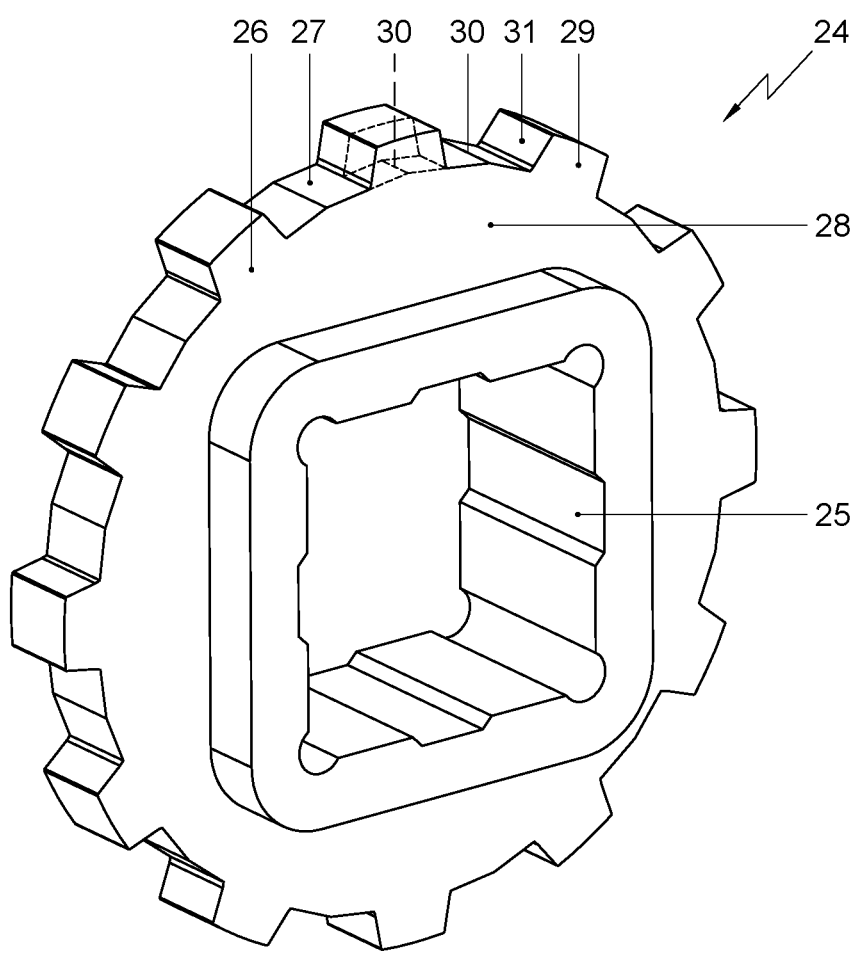
FIG. 8 shows a schematic perspective side view of the sprocket wheel of FIG. 7.

FIG. 8 shows a sprocket wheel 24 for cooperation with the modular conveyor mat 22. The sprocket wheel 24 in the example comprises a hub part 25, a substantially annular toothed ring 26 and a body part 28 connecting the hub part and the toothed ring. The toothed ring 26 comprises a series of teeth 29 spaced apart at an equal pitch along the circumference of a pitch circle, for cooperation with the tooth chambers 6 of a module 1. The teeth 29 are provided at their base with flat supporting surfaces 27 which jointly form a polygon corresponding to the number of teeth, whose angular points 30 are at a half pitch distance between the teeth 29. The angular points 30 form bent supporting surfaces which during use are located at the location of the cooperating hinge parts 9 at the front and rear 7,8 of successive mat modules 1. The number of angular points 30 is twice as large as the number of teeth 29. The angular points 30 are located in circumferential direction at the location of the middle of the teeth 29 and at the location of the half pitch between the teeth 29.

Figure 9:
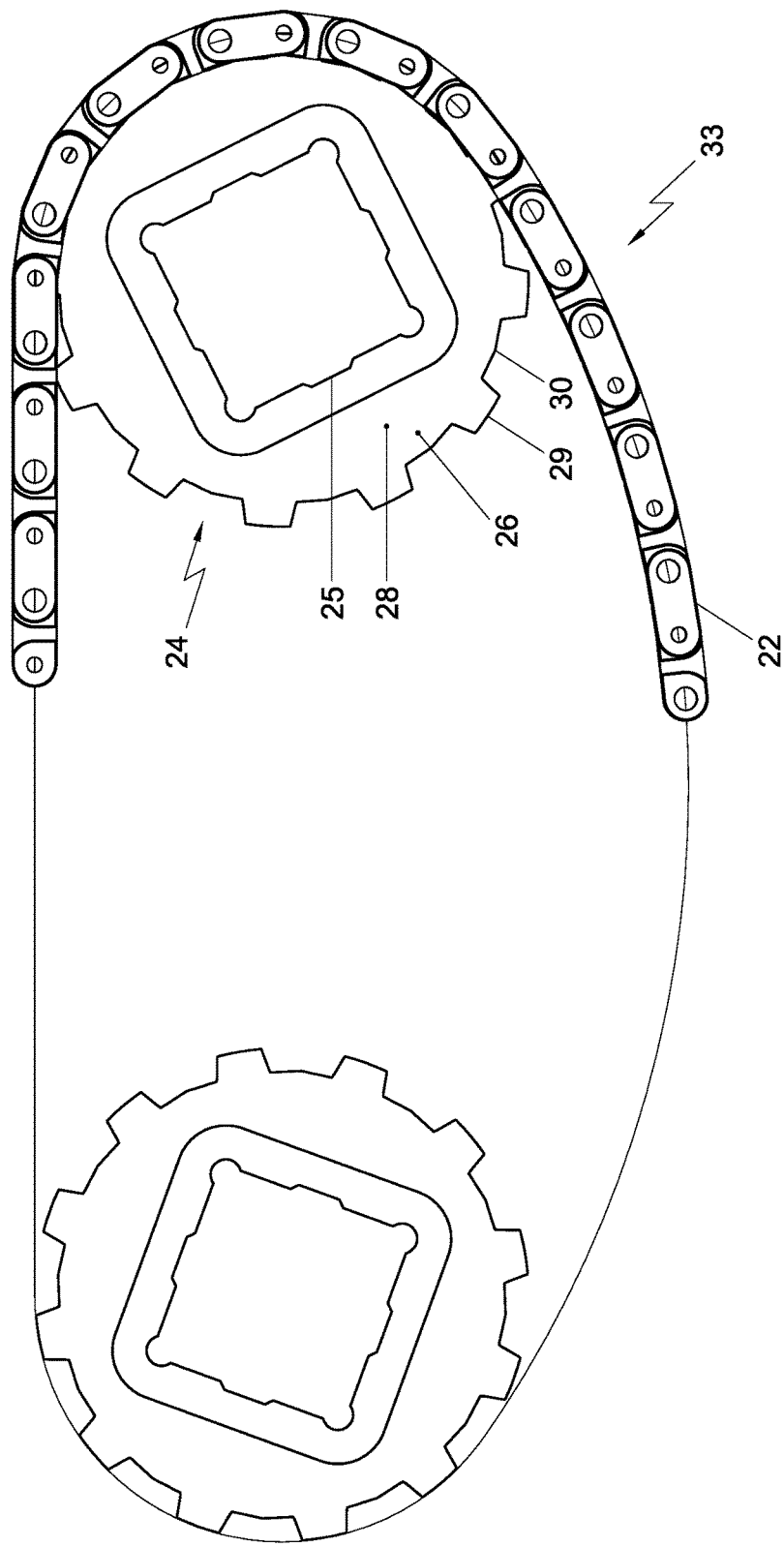
FIG. 9 shows a schematic perspective side view of a conveyor system.

FIG. 9 shows an exemplary embodiment of a conveyor system 33. The conveyor system comprises a modular conveyor mat 22, the series of successive modules of the conveyor mat forming an endless loop which circulates between sprocket wheels 24. The teeth 29 of the toothed ring 26 of the sprocket wheels 24 engage in the tooth chambers 6 of the modules 1, and the angular points 30 of the toothed ring 26 are located during use at the location of the cooperating hinge parts 9 at the front and rear 7,8 of successive mat modules 1. The side flanks 31 of the teeth 29 of the driving sprocket wheel 24 cooperate drivingly with the flat surfaces 18 in the tooth chamber 6, which function as driving surfaces.

The invention is not limited to the exemplary embodiment represented here. In particular, in the conveying direction, a multiple articulation may be arranged, and hence multiple internal hinges may be present. Further, the tooth chamber may be closed at the top, so that the top of the body part of the module is substantially closed, but the tooth chamber may also be open at the top, and be accessible from the top of the body part. Also, it will be clear that a module may be provided with several tooth chambers, for instance tooth chambers that are spaced apart transversely to the conveying direction. Also, modules of different design and type may be included in the mat, for instance, articulate modules without tooth chamber which, in a direction transverse to the conveying direction, are placed next to an articulate module with tooth chamber, or modules of different dimensions, with differently shaped hinge parts and/or differently shaped tops.

Such variants will be clear to those skilled in the art, and are understood to be within the scope of the invention as set forth in the following claims.

REFERENCE CHARACTERS 1 module
2 body part
2A front body part
2B rear body part
3 top
4 bottom
5 middle
6 tooth chamber
7 front
8 rear
9 hinge part
10 interspace
11 hinge pin
12 inner hinge
13 hinge bore
14 mutually facing sides
15 mutually facing sides
16 inner hinge part
17 inner hinge interspace
18 flat surface
19 longitudinal edge
20 inner hinge bore
20' inner hinge bore at the side
21 internal hinge pin
22 conveyor mat
23 rows of modules
24 sprocket wheel
25 hub part
26 toothed ring
27 supporting surfaces
28 body part
29 tooth
30 angular point
31 side flank
32 side
33 conveyor system
H1 central axis internal hinge pin
H2 central axis mat hinge pin
P conveying direction
R1 set of inner hinge parts
R2 set of inner hinge parts
Z pivoting axis

What is claimed is:

1. A module for a modular conveyor mat, said module comprising
    a body part extending transversely to a conveying direction with a top for carrying products to be conveyed and a bottom for cooperating with a conveying track;
    a tooth chamber formed in the bottom proximal a middle of the module when viewed in the conveying direction and extending transversely to the conveying direction for receiving a tooth of a sprocket wheel; and
    a series of hinge parts and receiving spaces alternately successive transversely to the conveying direction formed at a front and rear, so that hinge parts and receiving spaces can interdigitate with receiving spaces and hinge parts of similar modules successive in the conveying direction, and successive modules are hingedly couplable using hinge pins extending transversely to the conveying direction, reaching through hinge bores provided in the hinge parts, wherein the front is part of a, viewed in the conveying direction, front body part of the module, and the rear is part of a, viewed in the conveying direction, rear body part of the module, and that the front and rear body parts are hingedly connected with each other relative to a pivoting axis extending transversely to the conveying direction, which traverses the tooth chamber.

2. The module according to claim 1, wherein the pivoting axis is located in or near the middle of the module, viewed in the conveying direction of the module.

3. The module according to claim 1, wherein the front and the rear body parts are separate, molded parts.

4. The module according to claim 1, wherein the front body part and the rear body part are each, on the sides facing each other, provided with inner hinge parts and receiving spaces alternately successive transversely to the conveying direction, which cooperate as an internal hinge of the module.

5. The module according to claim 4, wherein the cooperating inner hinge parts are arranged in two sets, which are spaced apart at a mutual intermediate distance in the conveying direction, thereby enclosing the tooth chamber.

6. The module according to claim 5, wherein the sets of cooperating inner hinge parts are each coupled using a separate internal hinge pin extending transversely to the conveying direction, reaching through hinge bores provided in the hinge parts.

7. A modular conveyor mat, comprising a number of rows successive in the conveying direction, of modules according to claim 1, wherein the hinge parts and the receiving spaces at the respective front and rear of the successive modules cooperate, and successive modules are hingedly coupled using hinge pins extending transversely to the conveying direction, reaching through hinge bores provided in the hinge parts.

8. The modular conveyor mat according to claim 7, wherein the rows of modules transversely to the conveying direction comprise several modules located next to each other.

9. The modular conveyor mat according to claim 8, wherein in the row, modules located next to each other are coupled using the hinge pins reaching through the hinge bores provided in the hinge parts, extending continuously transversely to the conveying direction between modules located next to each other, while internal hinge pins are interrupted at the adjacent modules.

10. A sprocket wheel for driving a modular conveyor mat, comprising a hub part, a substantially annular toothed ring and a body part connecting the hub part and the toothed ring, wherein the toothed ring comprises a series of teeth spaced apart at an equal pitch along the circumference of a pitch circle, wherein the teeth are provided at their base with flat supporting surfaces which jointly form a polygon having angular points, the angular points being located in circumferential direction at the location of the middle of the teeth and at a half pitch distance between the teeth, such that the polygon has twice the number of angular points as compared to the number of teeth.

11. A conveyor system comprising a modular conveyor mat according to claim 7, wherein the series of successive modules of the conveyor mat form an endless loop which circulates between return wheels, at least a number of return wheels being implemented as a sprocket wheel according to claim 10, and wherein the teeth of the toothed ring of the sprocket wheels engage in tooth chambers of the modules, and wherein the angular points of the toothed ring during use are located at the location of the cooperating hinge parts at the front and rear of successive mat modules.

12. A conveyor system comprising a modular conveyor mat formed of modules and a sprocket wheel, wherein:
the modules comprising:
   a body part extending transversely to a conveying direction with a bottom for cooperating with a conveying track;
   a tooth chamber formed in the bottom near a middle of the module for receiving a tooth of the sprocket wheel; and
   a front body part and a rear body part of the module having a series of interdigitating hinge parts and receiving spaces hingedly coupling adjacent modules using hinge pins extending transversely to a conveying direction, the front body part and the rear body part are hingedly connected with each other relative to a pivoting axis extending transversely to the conveying direction and that traverses the tooth chamber;
the sprocket wheel comprising:
   a series of teeth forming a toothed ring, said teeth being spaced apart at an equal pitch along the circumference of a pitch circle, wherein the teeth are provided at their base with flat supporting surfaces which jointly form a polygon, whose angular points are located at the location of the cooperating hinge parts at a front of the front body part and a rear of the rear body part of successive modules, the angular points being located in circumferential direction at the location of the middle of the teeth and at the location of a half pitch between the teeth.

* * * * *